(12) United States Patent
Wolff

(10) Patent No.: US 6,358,585 B1
(45) Date of Patent: Mar. 19, 2002

(54) ECTRUDABLE CEMENT CORE THERMOPLASTIC COMPOSITE

(75) Inventor: John C. Wolff, Columbus, OH (US)

(73) Assignee: Crane Plastics Company Limited Partnership, Columbus, OH (US)

(*) Notice: Subject to any disclaimer, the term of this patent is extended or adjusted under 35 U.S.C. 154(b) by 0 days.

(21) Appl. No.: 08/856,449

(22) Filed: May 14, 1997

Related U.S. Application Data
(60) Provisional application No. 60/017,397, filed on May 14, 1996.

(51) Int. Cl.[7] .......................... B29D 22/00; B32B 18/00
(52) U.S. Cl. ................ 428/36.6; 428/325; 428/446; 428/451; 428/522; 427/393.6
(58) Field of Search ................ 428/36.6, 522, 428/325, 446, 451; 427/393.6

(56) References Cited

U.S. PATENT DOCUMENTS

| | | | | |
|---|---|---|---|---|
| 3,899,344 A | * | 8/1975 | Jakel | 524/5 |
| 4,040,851 A | * | 8/1977 | Ziegler | 438/532 |
| 4,053,339 A | * | 10/1977 | Story et al. | 156/62.2 |
| 4,114,335 A | * | 9/1978 | Carroll | 52/336 |
| 4,274,239 A | * | 6/1981 | Carroll | 52/443 |
| 4,478,018 A | * | 10/1984 | Holand | 60/452 |
| 4,489,109 A | * | 12/1984 | Puskar | 427/230 |
| 4,507,901 A | * | 4/1985 | Carroll | 156/200 |
| 4,588,625 A | * | 5/1986 | Puskar | 138/145 |
| 5,219,927 A | * | 6/1993 | Moggi | 525/54.3 |
| 5,308,397 A | * | 5/1994 | Whatcott | 106/711 |
| 5,360,476 A | * | 11/1994 | Whatcott | 106/719 |
| 5,486,391 A | * | 1/1996 | Tyner | 428/44 |
| 5,552,179 A | * | 9/1996 | Ramun | 427/136 |

OTHER PUBLICATIONS

Hardiplank Hardipanel, National Evaluation Service Report No. NER 405.
Siding Physical Properties. Eternit Inc., 1994.

\* cited by examiner

*Primary Examiner*—Leszek Kiliman
(74) *Attorney, Agent, or Firm*—Standley & Gilchrest LLP

(57) ABSTRACT

A panel for use in siding is disclosed. The panel has a cement core in a shape defining the panel of the siding, and a plastic film layer attached to the cement core. The plastic film layer is either a polymer or a copolymer of vinyl chloride. The panel may also have an adhesive layer which adheres the plastic film layer to the cement core. The cement core may contain fiber reinforcement.

9 Claims, 1 Drawing Sheet

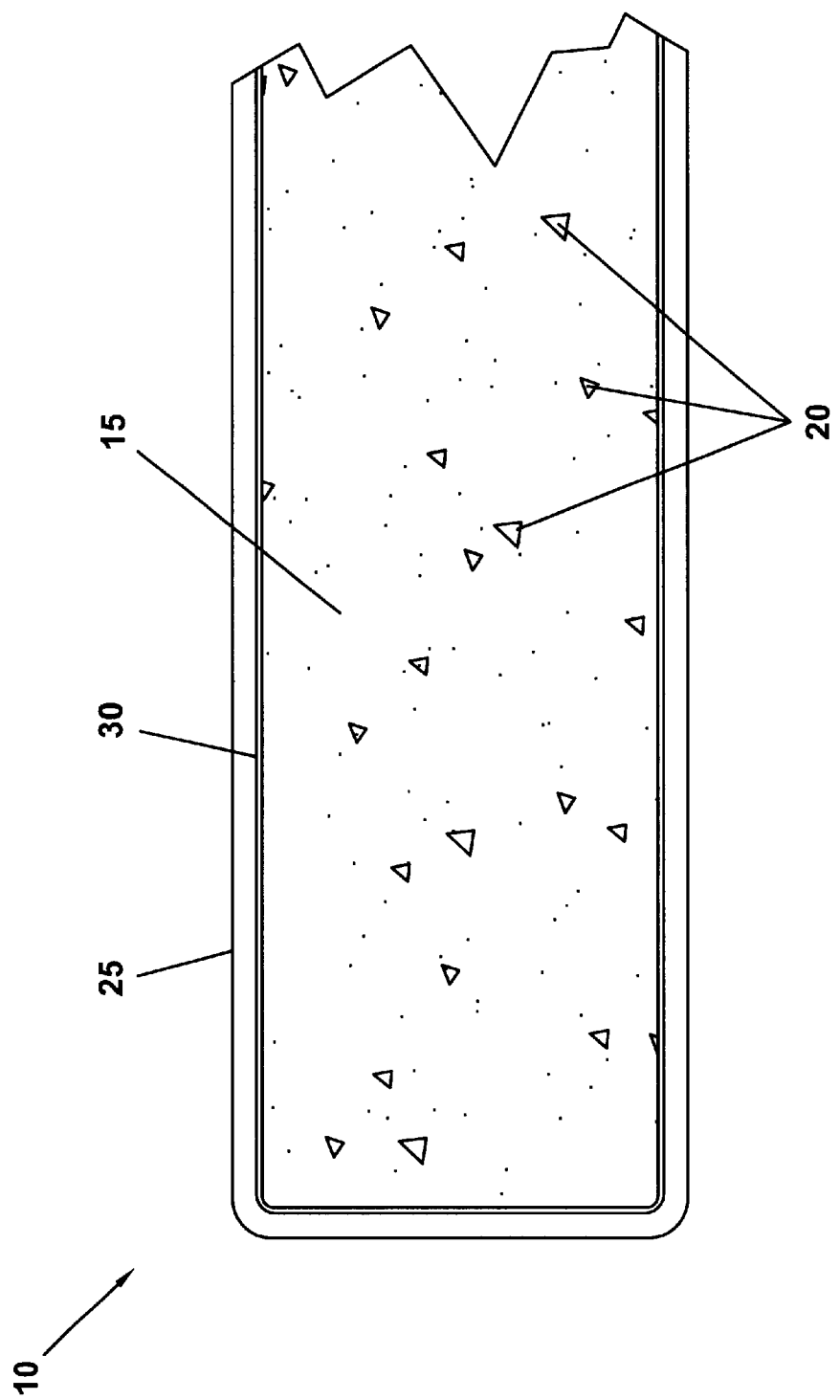

ECTRUDABLE CEMENT CORE THERMOPLASTIC COMPOSITE

This claims benefit of provisional application 60/017,397 filed May 14, 1996.

BACKGROUND AND SUMMARY OF THE INVENTION

Vinyl siding has long been used as exterior cladding for residential construction. It possesses good long term appearance retention. However, it suffers from several shortcomings. Color choice is limited due to heat build-up limitations. In addition, its strength (or stiffness) and thermal expansion behavior also limit its use. Finally, vinyl siding will soften, melt, or burn when exposed to high temperatures.

Cementious materials, such as Hardiplank® and Hardipanel™, have been used for residential siding. These materials possess good strength, thermal expansion behavior, and fire resistance. However, they require post-treatment, such as painting, in order to have acceptable aesthetics and resistance to environmental abuse.

Therefore, there is a need for a siding material which has good strength, thermal expansion characteristics, and fire resistance, as well as good long term appearance retention.

BRIEF DESCRIPTION OF THE DRAWINGS

FIG. 1 is a partial cross-section of the siding of the present invention.

DESCRIPTION OF THE INVENTION

The present invention is a panel for use in siding. The panel comprises a cement core in a shape defining the panel of the siding and a plastic film layer attached to the cement core. The plastic film layer is selected from the group consisting of polymers and copolymers of vinyl chloride. The panel may also include an adhesive layer which adheres the plastic film layer to the cement core. The cement core preferably contains fiber reinforcement. The plastic film layer preferably surrounds the cement core.

The siding panel of the present invention is shown in FIG. 1. The siding panel 10 has a cement core 15. The cement core 15 contains fiber reinforcements 20. The cement for the core may be any typical cement. The fibers used for reinforcement can be cellulose fibers, for example. A plastic film layer 25 is attached to the cement core 15 of the siding panel 10. The plastic film layer 25 is preferably made of polymers or copolymers of vinyl chloride. The plastic film layer 25 may be attached to the cement core 15 directly. Alternatively, an adhesive layer 30 may be used to attach the plastic film layer 25 to the cement core. Any adhesive which will adhere to the cement core and to the plastic film layer can be used.

The cement layer 15 and the plastic film layer 25 could be formed separately, followed by a lamination step attaching the plastic layer 25 to the cement core 15. Alternatively, the cement layer 15 could be coextruded with the plastic film layer 25, and the adhesive layer 30, if desired, through an appropriate die configuration, such as cross-head extrusion, to form the siding panel. The plastic film layer 25 may be attached to one side of the cement core 15 or to both sides. Coextrusion would allow the cement core 15 to be completely surrounded by the plastic film layer 25.

What is claimed is:

1. A panel for use in siding which comprises:
   a cement core in a shape defining the panel of the siding; and
   a plastic film layer attached to the cement core, wherein the plastic film layer is selected from the group consisting of polymers and copolymers of vinyl chloride.

2. The panel of claim 1 futher comprising an adhesive layer which adheres the plastic film layer to the cement core.

3. The panel of claim 1 wherein the cement core contains fiber reinforcement.

4. The panel of claim 1 wherein the plastic film layer surrounds the cement core.

5. A method of making a panel for use in siding which comprises coextruding a cement core and a plastic film layer to form a panel, wherein the plastic film layer is selected from the group consisting of polymers and copolymers of vinyl chloride.

6. The method of claim 5 further comprising coextruding an adhesive layer between the cement core and the plastic film layer.

7. The method of claim 5 wherein the plastic film layer is coextruded such that the plastic film layer completely surrounds the cement core.

8. A method of making a panel for use in siding which comprises laminating a plastic film layer to a cement core to form a panel, wherein the plastic film layer is selected from the group consisting of polymers and copolymers of vinyl chloride.

9. The method of claim 8 further comprising providing an adhesive layer between the plastic film layer and the cement core.

* * * * *

UNITED STATES PATENT AND TRADEMARK OFFICE
CERTIFICATE OF CORRECTION

PATENT NO.    : 6,358,585 B1
DATED         : March 19, 2002
INVENTOR(S)   : Wolff It is certified that error appears in the above-identified patent and that said Letters Patent is hereby corrected as shown below:

<u>Title page,</u>
Title, please delete the word "ECTRUDABLE" and replace it with
-- EXTRUDABLE --.

<u>Column 1,</u>
Line 1, please correct the Title by deleting the word "ECTRUDABLE" and replacing it with -- EXTRUDABLE --.

Signed and Sealed this

Fourth Day of June, 2002

*Attest:*

JAMES E. ROGAN
*Attesting Officer*  *Director of the United States Patent and Trademark Office*